March 31, 1959  D. E. LUPFER ET AL  2,880,073
GAS ANALYZER
Filed April 13, 1955  3 Sheets-Sheet 1
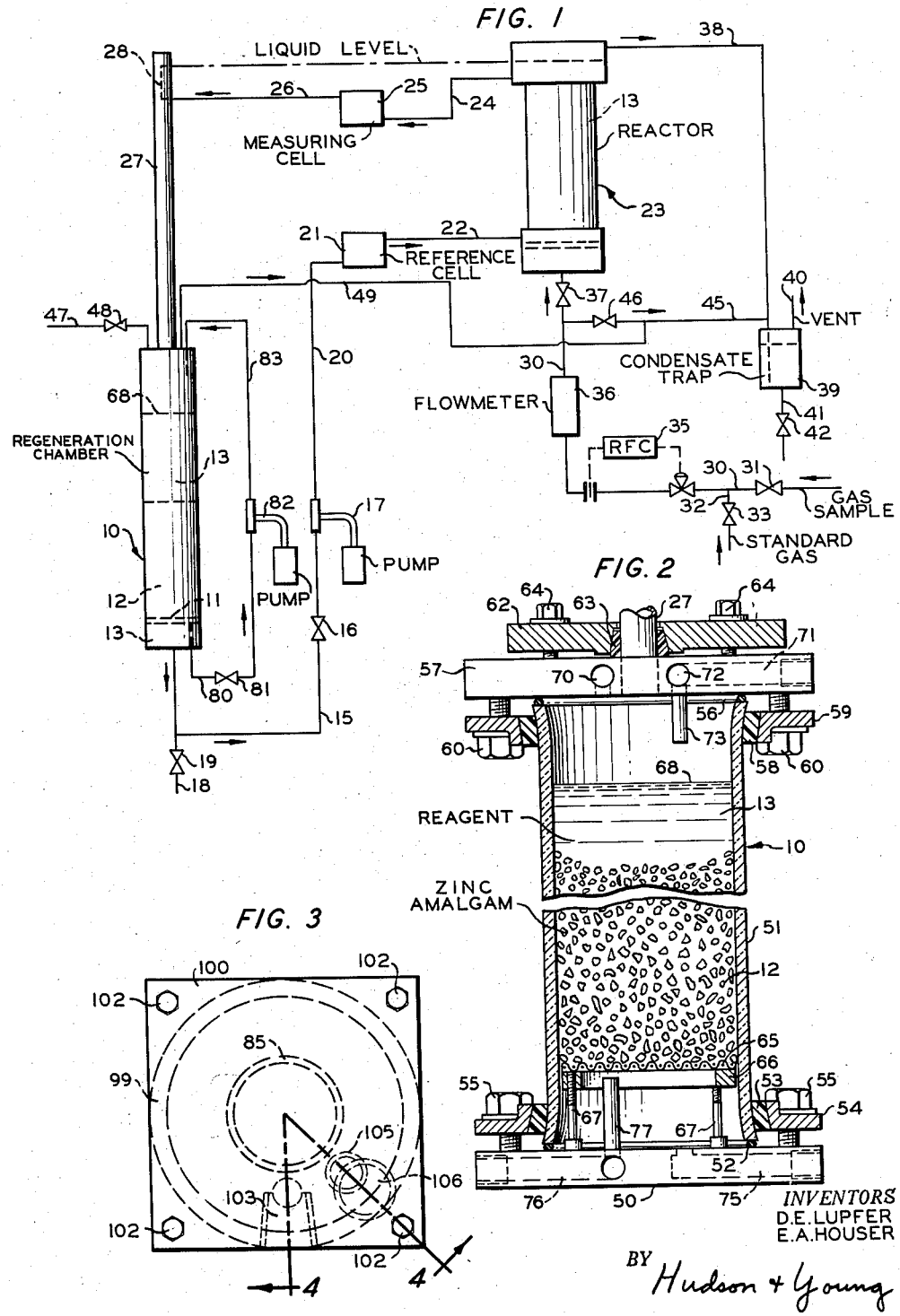
INVENTORS
D.E. LUPFER
E.A. HOUSER
BY Hudson & Young
ATTORNEYS March 31, 1959  D. E. LUPFER ET AL  2,880,073
GAS ANALYZER
Filed April 13, 1955  3 Sheets-Sheet 2

INVENTORS
D.E. LUPFER
E.A. HOUSER
BY Hudson & Young
ATTORNEYS

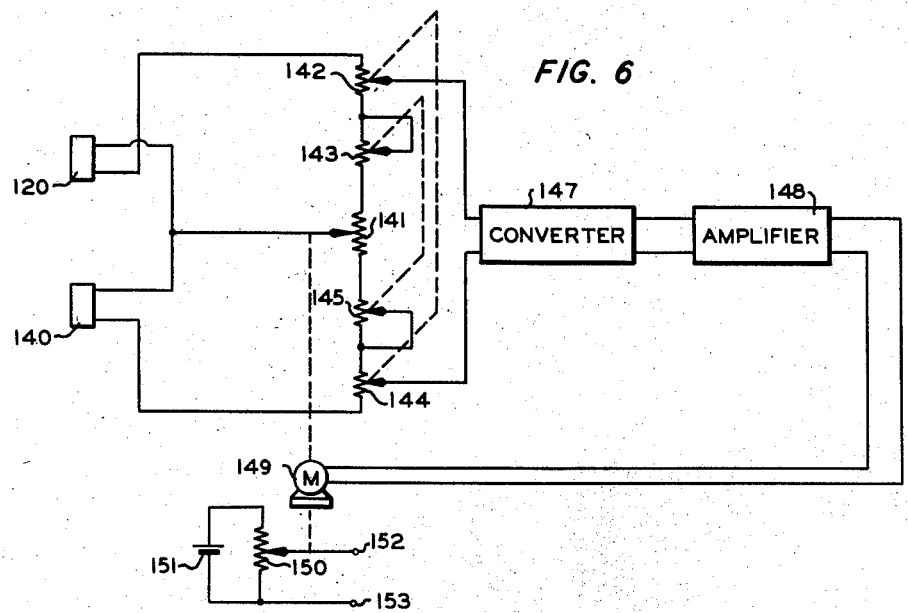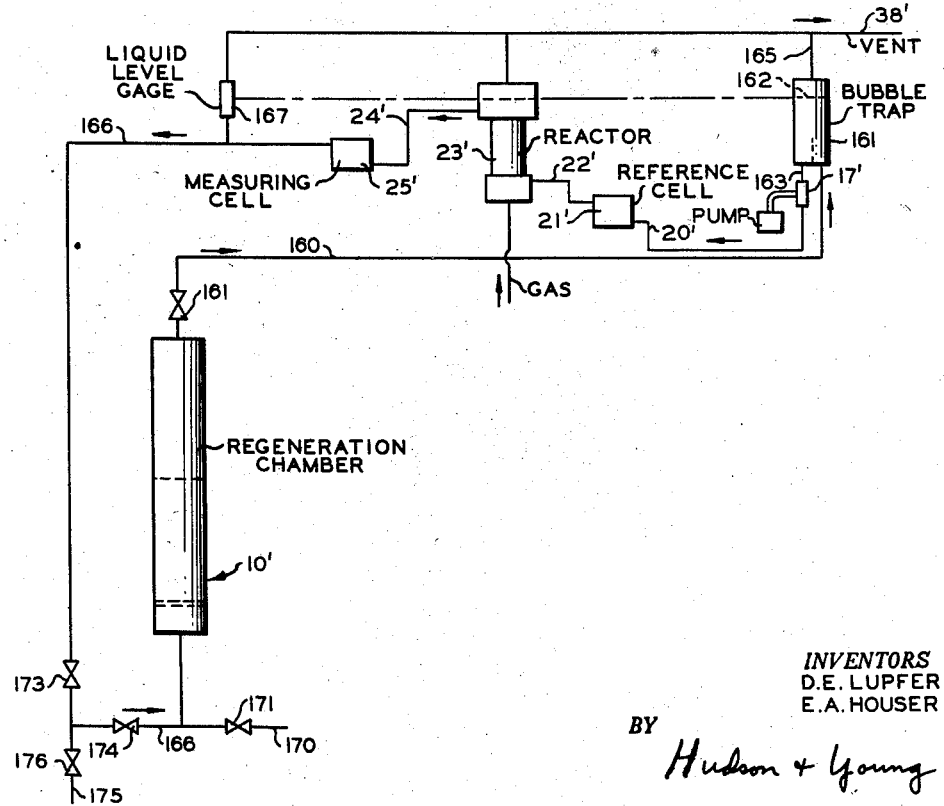

United States Patent Office 2,880,073
Patented Mar. 31, 1959

2,880,073

GAS ANALYZER

Dale E. Lupfer and Edwin A. Houser, Bartlesville, Okla., assignors to Phillips Petroleum Company, a corporation of Delaware Application April 13, 1955, Serial No. 501,151

7 Claims. (Cl. 23—254)

This invention relates to the analysis of substances by optical means. In another aspect it relates to a system wherein a reagent employed to detect a particular substance is regenerated continuously.

In various industrial operations it is important to measure the concentration of particular gases in fluid streams. For example, oxygen is known to be detrimental to the polymerization of various compounds. In the production of synthetic rubber by the copolymerization of butadiene and styrene, the presence of even small quantities of oxygen reduces the rate of reaction. In the polymerization of ethylene, controlled amounts of oxygen are often employed as a catalyst. For these reasons it is important to be able to detect the presence of gases, such as oxygen, when present in fluid streams in concentrations as low as several parts per million. Optical analyzers are known which detect selected fluids by their influence on the radiation absorption properties of a selected reagent. It is known to transmit a first beam of radiation through the reagent before its contact with the fluid to be analyzed and to transmit a second beam of radiation through the reagent after its contact with the fluid to be analyzed. The transmitted beams are compared to determine the amount of the particular substance under analysis present in the test fluid.

In accordance with the present invention there is provided an improved optical analyzer of this general type. The reagent selected is one capable of undergoing reversible reactions when contacted with the substance being tested and with a regeneration substance. A liquid reagent is circulated continuously through a reference cell, a liquid-gas reactor chamber, a measuring cell and a regeneration chamber. An important feature of this invention resides in means to remove gases entrained in the liquid reagent. This eliminates gas bubbles in the sample cells which tend to cause unsteady readings in the analyzer output signal. These means can be in the form of a recirculating line around the regeneration chamber and a gas vent line communicating with the regeneration chamber. Another means to remove entrained gases comprises a bubble trap in the system downstream from the regeneration chamber. The reagent circulation system is constructed so as to maintain a predetermined liquid level in the reactor chamber. This insures that the gas being analyzed contacts a constant amount of liquid reagent at all times.

Accordingly, it is an object of this invention to provide an improved method of and apparatus for analyzing fluid streams.

Another object is to provide an optical analyzer wherein a liquid reagent is circulated in contact with a gas stream to be analyzed, with a regeneration substance, and again in contact with the gas stream.

A further object is to provide a system for removing gases entrained in a liquid stream in an optical analyzer.

Other objects, advantages and features of this invention should become apparent from the following detailed description taken in conjunction with the accompanying drawing in which:

Figure 1 is a schematic diagram of a first embodiment of the reagent circulation system of the analyzer of this invention;

Figure 2 is a detail view, shown partially in section, of the regeneration chamber of Figure 1;

Figure 3 is a top view of the reactor of Figure 1;

Figure 6 is a schematic circuit diagram of the electrical components of the analyzer; and Figure 7 is a schematic diagram of a second embodiment of the reagent circulation system.

Figure 5:
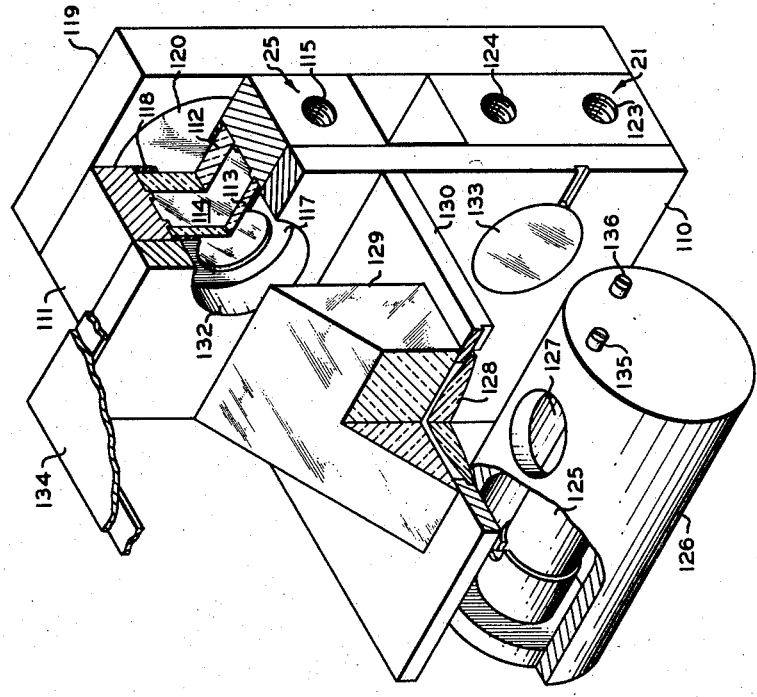
Figure 5 is a perspective view, shown partially in section, of the optical system of the analyzer.

For purposes of describing the principles of this invention, reference will be made to a particular analysis of a gas stream to determine the oxygen content thereof. However, as described in detail hereinafter the invention is not limited to this particular analysis.

Referring now to the drawing in detail, and to Figure 1 in particular, there is shown a regeneration column 10 having a screen 11 in the lower portion thereof to support a mass of zinc amalgam 12. An alkaline aqueous solution of sodium anthraquinone beta-sulfonate 13 is also contained in chamber 10. This solution is reduced by contact with the amalgam to acquire a deep red color. The reduced sulfonate solution is directed from column 10 through a conduit 15, having a valve 16 therein, to the inlet of a bellows pump 17. A drain conduit 18, having a valve 19 therein, communicates with conduit 15. The outlet of pump 17 is connected by a conduit 20 to the inlet of a reference cell 21. A conduit 22 communicates between the outlet of reference cell 21 and the liquid inlet of a reactor 23. The liquid outlet of reactor 23 is connected by a conduit 24 to the inlet of a measuring cell 25. A conduit 26 extends between the outlet of cell 25 and an upright conduit 27 which communicates with the top of chamber 10 at its lower end. Conduit 26 has an upright end portion 28 thereof which is positioned within conduit 27. The top of conduit 28 is at the same level as the liquid level in reactor 23. The sulfonate solution directed through conduit 26 thus overflows from conduit 28 and is returned to chamber 10 through conduit 27. This arrangement maintains a constant liquid level in reactor 23.

The gas sample to be analyzed is directed through a conduit 30 to a gas inlet in the bottom of reactor 23. Conduit 30 has an inlet valve 31 therein. A second conduit 32, having a valve 33 therein, communicates with conduit 30 downstream from valve 31. Conduit 32 is provided to transmit a standardization gas into reactor 23 when it is desired to calibrate the instrument. In normal operation valve 31 is opened and valve 33 is closed so that the test sample is directed into reactor 23. Conduit 30 has a rate of flow controller 35 therein to maintain a predetermined flow of gas into reactor 23. This flow rate is measured by a flowmeter 36. A valve 37 is also contained in conduit 30. The gas sample to be analyzed passes through reactor 23 and makes contact with the reduced sulfonate solution therein. The gas is then vented through a conduit 38 which communicates with the gas outlet of reactor 23. Conduit 38 extends into a liquid trap 39. A vent conduit 40 communicates with the outlet of trap 39. A drain conduit 41, having a valve 42 therein, communicates with the bottom of trap 39. The gas directed through reactor 23 tends to become saturated with the liquid solution therein so that trap 39 is desirable to remove this solution from the vented gas. A conduit 45, having a valve 46 therein, communicates between the inlet of trap 39 and conduit 30 upstream from valve 37. This enables the gas sample to be by-passed around reactor 23 if desired.

In order to obtain an accurate analysis of the presence of small quantities of oxygen of the gas stream directed through reactor 23 it is important that the sulfonate solution be circulated through the reactor at an absolutely constant rate. This is provided by the bellows pump 17. To insure a constant circulation of reagent through reactor 23 it is necessary that the liquid level in the reactor be maintained constant. This is provided by conduit 28 as previously described. In operation of this analyzer some of the reagent solution is lost continuously by being absorbed by the gas sample. However, this merely lowers the solution level in regeneration chamber 10 and does not have any detrimental effect on the operation of the analyzer. Additional solution can be added to chamber 10 as needed through a conduit 47 which communicates with the top of chamber 10. Conduit 47 has a valve 48 therein.

Regeneration chamber 10 is illustrated in detail in Figure 2. The chamber comprises a base plate 50 which supports an upright pipe 51. An O-ring seal 52 is positioned between the lower edge of pipe 51 and base plate 50. The lower edge of pipe 51 is provided with an outwardly extending portion which is engaged by a sealing ring 53. A flange 54 engages sealing ring 53 and is secured to plate 50 by a plurality of screws 55. A second O-ring seal 56 rests upon the top of pipe 51, and a top plate 57 rests thereon. The upper portion of pipe 51 also has an outwardly extending portion which is engaged by a sealing ring 58. A flange 59 engages sealing ring 58 and is secured to plate 57 by a plurality of screws 60. Conduit 27 is fitted into top plate 57 and secured thereto by a flange 62. Flange 62 engages a sealing ring 63 which surrounds conduit 27. Flange 62 is secured to plate 57 by a plurality of screws 64. A screen 65 is supported in the lower portion of pipe 51 by a ring 66 which is supported by a plurality of screws 67 that extend upwardly from base plate 50. The granular zinc amalgam 12 rests upon screen 65. The sulfonate solution 13 fills pipe 51 to a level such as indicated at 68.

A first passage 70 is formed in top plate 57 to communicate with the interior of the regeneration chamber. Conduit 47 of Figure 1 communicates with passage 70. A second passage 71 is formed in top plate 57 to communicate with the interior of chamber 10. Conduit 49 of Figure 1 communicates with passage 71 to vent gas from chamber 13. A third passage 72 extends through top plate 57 and comunicates with a pipe 73 at its inner end. Pipe 73 depends from plate 57 into pipe 51. A liquid outlet passage 75 is formed in bottom plate 50. This passage communicates with conduit 15 of Figure 1. A second liquid outlet passage 76 is formed in base plate 50. This passage communicates at its inner end with a pipe 77 which extends upwardly into pipe 51 to a region immediately below screen 65.

Liquid outlet passage 76 of Figure 2 communicates with a conduit 80 of Figure 1 which has a valve 81 therein. Conduit 80 extends between passage 76 and the inlet of a second bellows pump 82. The outlet of bellows pump 82 is connected to a conduit 83 which communicates with inlet passage 72 of Figure 2. Conduit 80, pump 82 and conduit 83 thus provide a means to recirculate a portion of the sulfonate solution back through the zinc amalgam to provide a more complete regeneration thereof. This also directs hydrogen bubbles which tend to accumulate beneath amalgam 12 to the upper portion of the regeneration chamber. The bubbles are then removed through vent line 49. This is an important feature in the operation of the analyzer because the presence of gas bubbles in the reagent circulated through reference cell 21 results in erroneous readings. The sample gas circulated through reactor 23 is removed directly through vent line 38 to minimize the danger of gas bubbles being directed through measuring cell 25.

Figure 4:
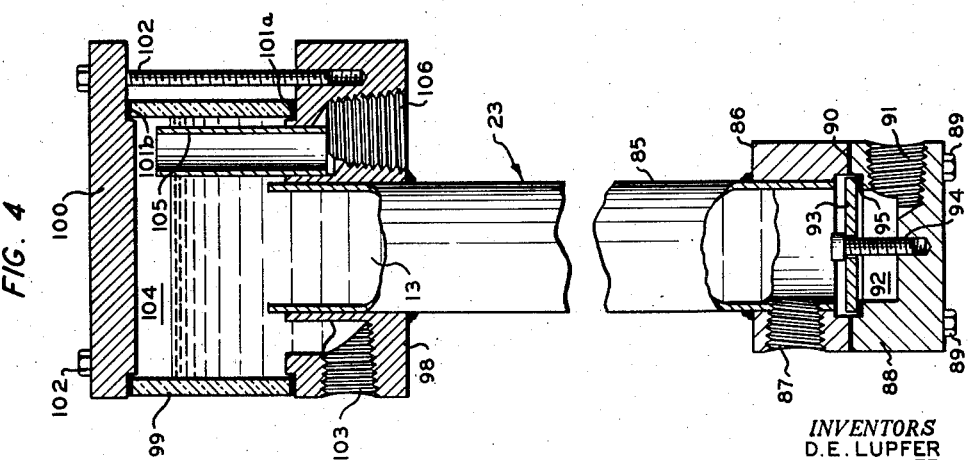
Figure 4 is a sectional view taken along the line 4—4 in Figure 3.

Reactor 23 is illustrated in detail in Figures 3 and 4. This reactor comprises an upright pipe 85 which has a base plate 86 welded at the lower end thereof. A liquid inlet passage 87 extends through plate 86 to communicate with pipe 85. Conduit 22 of Figure 1 communicates with inlet passage 87. A base cap 88 is secured to the lower portion of base 86 by a plurality of screws 89. A gasket 90 is fitted between base 86 and cap 88. Cap 88 has an inlet passage 91 therein which communicates with conduit 30 of Figure 1. Passage 91 communicates at its inner end with a chamber 92 in cap 88. A filter disc 93 is secured between chamber 92 and pipe 85 by a screw 94. A sealing ring 95 is fitted between disc 93 and cap 88. Disc 93 preferably is formed of porous stainless steel and is permeable to gas but impermeable to liquid. The gas stream form conduit 30 thus passes upwardly through pipe 85 in contact with the liquid reagent circulated therethrough.

A body member 98 is welded to the upper portion of pipe 85. A glass cylinder 99 rests upon body 98 and a top plate 100 rests upon cylinder 99. A first gasket ring 101a is fitted between cylinder 99 and body 98, and a second gasket ring 101b is fitted between cylinder 99 and top plate 100. These members are secured in assembled relation by a plurality of screws 102. A liquid outlet passage 103 extends through body 98 to communicate with the chamber 104 formed by cylinder 99. Conduit 24 of Figure 1 communicates with passage 103. A pipe 105 is fitted to and extends upwardly from body 98 through chamber 104. The top of this pipe is above the liquid level in chamber 104. A passage 106 in body 98 communicates at its inner end with pipe 105. Gas vent conduit 38 of Figure 1 communicates with the outlet of passage 106.

The optical components of the analyzer are illustrated in Figure 5. Reference cell 21 and measuring cell 25 are mounted adjacent one another on a plate 110. Cell 25 is illustrated in detail. This cell comprises a frame 111 which supports a glass window 112 and a light filter 113 in spaced relationship. Filter 113 transmits visible radiation in the region absorbed by the reagent. The maximum absorption is in the region of 525 millimicrons. A chamber 114 is thus formed between window 112 and filter 113. A first passage 115 is formed in frame 111 to communicate between chamber 114 and conduit 24 of Figure 1. A corresponding outlet passage, not shown, is formed in frame 111 to communicate between chamber 114 and conduit 26 of Figure 1. The two passages in frame 111 communicate with chamber 114 at opposite sides thereof so that the sulfonate reagent passes through the center portion of the chamber. A first light opaque ring 117 is positioned between plate 110 and filter 113. This ring serves the dual functions of restricting the light passage through cell 25 and forming a seal between chamber 114 and mounting plate 110. A corresponding ring 118 is positioned between window 112 and a back plate 119 which houses a pair of photovoltaic cells. The first photocell 120 is shown adjacent window 112. The construction of cell 21 is identical to that of cell 25. Cell 21 is provided with an inlet passage 123 and an outlet passage 124 which communicate with respective conduits 20 and 22 of Figure 1.

A lamp 125, which emits radiation in the visible spectrum, is mounted in a housing 126. Housing 126 is provided with a first opening 127 through which radiation is transmitted upwardly through a collimating lens 128 to a reflecting prism 129. Lens 128 and prism 129 are mounted on a support plate 130 which is attached to plate 110. Radiation transmitted through window 127 thus passes through lens 128 and is reflected by prism 129 through an opening 132 in plate 110, filter 113 and window 112 to impinge upon photocell 120. A second beam of radiation from bulb 125 passes through a second opening, not shown, in the side of housing 126 and through a collimating lens 133 which directs radiation through sample cell 21 to impinge upon the second photocell supported by plate 119. Set screws 135 and 136 are provided in housing 126 to extend into the radiation beams to reduce the radiation transmitted through the respective housing windows.

The electrical components of the system are illustrated in Figure 6. The first output terminal of photocell 120 is connected to the corresponding output terminal of the second photocell 140 which is positioned adjacent reference cell 21 in Figure 5. These two first terminals are also connected to the contactor of a potentiometer 141. The second output terminal of photocell 120 is connected to the first end terminal of a second potentiometer 142. The second end terminal of potentiometer 142 is connected to the first terminal of a variable resistor 143. The second terminal of variable resistor 143 is connected to the first end terminal of potentiometer 141. The second output terminal of photocell 140 is connected to the first end terminal of a third potentiometer 144. The second end terminal of potentiometer 144 is connected to the first terminal of a second variable resistor 145. The second terminal of variable resistor 145 is connected to the second end terminal of potentiometer 141. The arms of variable resistors 143 and 145 are mechanically connected to one another so that an increase in resistance of one of the elements results in a corresponding decrease in the resistance of the other. The contactors of potentiometers 142 and 144 are mechanically coupled to one another so that movement of the contactor of one of these potentiometers toward the first end terminal thereof results in corresponding movement of the contactor of the second potentiometer away from the first end terminal thereof. The contactors of potentiometers 142 and 144 are connected to the respective input terminals of a servo measuring system which can comprise a converter 147, an amplifier 148 and a reversible motor 149. This servo system can be of the form described in The Electronic Control Handbook, Batcher and Moulic, Caldwell-Clements, Inc., N.Y. (1946), page 298. Converter 147 changes the direct potential signal applied thereto into a corresponding alternating signal which is amplified by amplifier 148 and applied to motor 149. If a signal of first polarity is applied to converter 147, motor 149 rotates in a first direction. The motor rotates in a second direction if a signal of opposite polarity is applied to converter 147. The drive shaft of motor 149 is mechanically coupled to the contactor of potentiometer 141.

The drive shaft of motor 149 is also mechanically coupled to the contactor of a telemetering potentiometer 150. A voltage source 151 is connected across the end terminals of potentiometer 150. The contactor and one end terminal of potentiometer 150 are connected to respective output terminals 152 and 153. These output terminals can be connected to a suitable voltage indicating instrument or to a control instrument if it is desired to adjust a process variable in response to the analysis of the sample gas supplied to the analyzer. The voltage appearing between terminals 152 and 153 is a function of the position of motor 149.

The measuring system of Figure 6 is of the null balance type and provides a measurement of the difference between the output signals generated by radiation impinging upon photocells 120 and 140. This difference is represented by the position of the contactor of potentiometer 141. Photocells 120 and 140 are preferably of the barrier layer type which provide currents that are representative solely of the light impinging thereon. Within practical limits, the output currents are not varied by changes in resistance across the output terminals of the cells. The electrical bridge circuit connected to the cells comprises two circuit paths. If the bridge circuit is balanced so that there is a zero potential difference between the contactors of potentiometers 142 and 144, the current from photocell 120 flows through potentiometer 142, resistor 143 and the upper half of potentiometer 141. The current from photocell 140 is through potentiometer 144, resistor 145 and the lower portion of potentiometer 141.

The instrument is adjusted initially in the absence of oxygen flowing through reactor 23. This can be accomplished by closing valves 31 and 33 in Figure 1. The color of the reagent circulated through cell 21 is the same as the color of the reagent circulated through cell 25 so that there is equal light absorption in the two cells. The bridge circuit is adjusted so that there is zero potential difference between the contactors of potentiometers 142 and 144 at this time. This adjustment can be made by inserting set screws 135 and 136 selectively into the two radiation beams and/or by adjustment of coupled resistors 143 and 145. Adjustment of these two resistors varies the effective resistance in the two circuit loops to provide the desired balance condition. The analyzer can then be calibrated by passing a standard gas having a known amount of oxygen therein into reactor 23 from conduit 32. The color of the reagent circulated through measuring cell 25 is changed because the oxidation of the reagent in reactor 23 reduces the intensity of the red color thereof. Thus, more radiation is transmitted through cell 35 so that the output signal from photocell 120 is greater than the signal from photocell 140. This results in a potential difference between the contactors of potentiometers 142 and 144 so that a signal is applied to converter 147 which, after amplification, drives motor 149. The drive shaft of motor 149 is coupled to the contactor of potentiometer 141 in a manner so that the contactor is moved in the direction to eliminate the voltage difference between the contactors of potentiometers 142 and 144. If the contactor of potentiometer 141 is moved upwardly the resistance in the upper circuit loop is decreased and the resistance in the lower circuit loop is increased. This compensates for the additional current flow from photocell 120.

During actual operation of the analyzer, the gas sample to be detected is circulated through reactor 23 from conduit 30. Any change in the oxygen content results in a difference in the light absorption in cell 25. This unbalances the bridge circuit in one direction or the other so that motor 149 is rotated in one direction or the other to restore the balance condition. The degree of rotation of motor 149 is thus a function of the changing oxygen content in the sample gas. This can be measured either by a visual indication of the motor rotation or by measuring the voltage appearing between terminals 152 and 153.

In Figure 7 there is illustrated a second embodiment of the reagent circulation system. This system is generally similar to that shown in Figure 1 and corresponding elements are designated by like primed reference numerals. The liquid reagent is circulated through regeneration chamber 10' in a direction opposite to the circulation in Figure 1. An outlet conduit 160, having a valve 161 therein, communicates with the top of chamber 10'. Conduit 160 also communicates with the first inlet of a bubble trap 161. The liquid reagent fills trap 161 to the level indicated at 162. A conduit 163 communicates between the liquid outlet of bubble trap 161 and the inlet of a pump 17'. The liquid inlet and the liquid outlet in bubble trap 161 are spaced from one another so that the circulating reagent is directed through a portion of trap 161. Any gas bubbles entrained in the liquid reagent pass outwardly from trap 161 through a conduit 165 which communicates with a vent conduit 38'. From pump 17' the reagent is directed through conduit 20', reference cell 21', conduit 22', reactor 23', conduit 24', measuring cell 25' and conduit 166 to the bottom inlet of chamber 10'. Valves 173 and 174 are contained in conduit 166. A liquid level gauge 167 communicates with conduit 166. The top of liquid level gauge and the top of reactor 23' communicate with vent conduit 38'. Gauge 167 provides a measurement of the liquid level in reactor 23'. As previously mentioned, it is important that this level be maintained constant. This is accomplished by adding additional reagent to chamber 10' as needed through a conduit 170 which has a valve 171 therein. A drain conduit 175, having a valve 176 therein communicates with conduit 166.

As previously discussed, it has been found that sodium anthraquinone-beta-sulfonate is a particularly useful reagent to detect the presence of oxygen because of the color change in the reduced solution when oxidized. This solution can conveniently be prepared in the following manner: A two liter volumetric flask is filled approximately three-fourths full with distilled water. One-hundred-twenty-five milligrams of sodium anthraquinone-beta-sulfonate are dissolved in the flask by brisk shaking. Twenty-five milliliters of 5 percent sodium hydroxide solution are added to the flask and sufficient distilled water is added to fill the flask to the two liter mark. It is important that the solution thus prepared be stored in light opaque containers because the reagent deteriorates rapidly under the influence of light. The zinc amalgam is conveniently made by using granulated 20–30 mesh zinc metal. The zinc is placed in a container and covered with a saturated solution of mercuric chloride. The zinc and the mercuric chloride are agitated until the zinc becomes dark gray in color. The liquid is drained from the zinc and the zinc is covered with a 15 percent solution of hydrochloric acid. The zinc is agitated in this solution until the amalgam is uniformly bright. The amalgam is then washed thoroughly with distilled water.

The method and apparatus of this invention obviously are not limited to the specific reagents described above. In the analysis of oxygen, for example, an alkaline solution of pyrogallol is colorless, but turns brown when oxygen is absorbed. The oxidized pyrogallol solution can be regenerated by a suitable reducing agent, such as the zinc amalgam described above. A third oxygen detecting reagent is an ammoniacal cuprous chloride solution which is colorless in the reduced state, but blue when oxygen is absorbed. This solution can be regenerated in the same manner. Other suitable reagents can be used to detect other gases.

While the invention has been described in conjunction with a present preferred embodiment, the invention obviously is not limited thereto.

What is claimed is:

1. An analyzer reagent circulation system comprising a first sample cell; a second sample cell; a first liquid-gas contacting chamber; a second chamber adapted to contain a regeneration reagent; a conduit extending upwardly from said second chamber; means to circulate a liquid from the outlet of said second chamber through said first cell, said first chamber, and said second cell to the interior of said conduit at a vertical height which is the same as a predetermined height in the body of liquid in said first chamber, said liquid flowing from said first chamber to said conduit and thence downwardly through the regeneration chamber by gravity; and conduit means including pumping means communicating with said second chamber at locations below and above the reagent occupying region therein to pump liquid from below the reagent occupying region of said second chamber to above the reagent occupying region of said second chamber.

2. An analyzer reagent circulation system comprising a first sample cell; a second sample cell; a first liquid-gas contacting chamber; a second chamber adapted to contain a regeneration reagent; a third chamber having first and second spaced liquid openings in the lower portion thereof; means communicating with a vent opening in the upper portion of said third chamber to remove gases therefrom; and means to circulate a liquid from the outlet of said second chamber through said first and second spaced openings and said first cell into said first chamber; said first chamber being positioned with respect to said second chamber and said second cell so that liquid flows by gravity from said first chamber through said second cell to said second chamber; said third chamber being positioned with respect to said first chamber so that the liquid level in said third chamber is below said vent opening therein.

3. An analyzer comprising a first sample cell; a second sample cell; a first liquid-gas contacting chamber; a second chamber adapted to contain a regeneration reagent; a third chamber having first and second spaced liquid openings in the lower portion thereof; means communicating with a vent opening in the upper portion of said third chamber to remove gases therefrom; means to circulate a liquid from the outlet of said second chamber through said first and second spaced openings and said first cell into said first chamber; said first chamber being positioned with respect to said second chamber and said second cell so that liquid flows by gravity from said first chamber through said second cell to said second chamber; said third chamber being positioned with respect to said first chamber so that the liquid level in said third chamber is below said vent opening therein; means to direct a first beam of radiation through said first cell; means to direct a second beam of radiation through said second cell; and means to compare the transmitted radiation of said first and second beams.

4. A continuous analyzer comprising a liquid-gas contacting vessel, a regeneration chamber having a support for regeneration material adjacent its lower end, a body of regeneration material carried by said support, a measuring cell, a first line extending from the top of said contacting vessel through said measuring cell to the top of said regeneration chamber, a reference cell, a second line extending from the bottom of said regeneration chamber and below said support for regeneration material through said reference cell to the bottom of said vessel, a pump in said second line, a conduit extending from a region immediately below said support and above said second line to a region of said regeneration chamber above said body of regeneration material, a pump in said conduit, and means positioned above said body of regeneration material for venting the gases which collect above the regeneration material, including the gases which collect beneath said support and then are pumped through said conduit to above the regeneration material.

5. Apparatus of claim 4 wherein said first line discharges into said regeneration chamber at a point equal in level to the liquid level in said vessel.

6. An analyzer reagent circulation system comprising a first sample cell; a second sample cell; a first liquid-gas contacting chamber; a second chamber adapted to contain a regeneration reagent; a conduit extending upwardly from said second chamber; a third chamber disposed below and having an inlet in communication with said second chamber; means communicating with the upper portion of said third chamber for removing gases from said third chamber; and means for circulating a liquid from the lower portion of said third chamber through said first cell, said first chamber, and said second cell, to the interior of said conduit at a vertical height which is the same as a predetermined height in a body of liquid in said first chamber, said liquid flowing by gravity from said first chamber to said conduit, thence downwardly to said second chamber and to said third chamber.

7. An analyzer reagent circulation system comprising a first sample cell; a second sample cell; a first liquid-gas contacting chamber; a vertically arranged second chamber having first and second inlets and a first outlet all disposed in its upper portion and a perforate means for supporting reagent and defining the bottom of said second chamber; a third chamber disposed beneath said perforate means and having a second outlet disposed adjacent the bottom of said third chamber and a third outlet disposed beneath said perforate means and above said second outlet; means connected between said third outlet and said first inlet for transferring fluids from said third chamber to said second chamber; and means connected to said second outlet for circulating liquid from said third chamber through said first sample cell, said first chamber, said second sample cell, and to said second inlet of said second chamber; and means connected to said first outlet for removing gases from said second chamber.

References Cited in the file of this patent

UNITED STATES PATENTS

| | | |
|---|---|---|
| 1,097,782 | Wolf | May 26, 1914 |
| 2,160,177 | Shuman | May 30, 1939 |
| 2,170,596 | Quiggle | Aug. 22, 1939 |
| 2,382,381 | Calvert et al. | Aug. 14, 1945 |
| 2,413,261 | Stackhouse | Dec. 24, 1945 |
| 2,417,877 | Lewis | Mar. 25, 1947 |
| 2,421,568 | Kurland | June 3, 1947 |
| 2,431,899 | Wolf et al. | Dec. 2, 1947 |
| 2,586,503 | Barnard | Feb. 19, 1952 |

OTHER REFERENCES

Brady: "Analytical Chemistry," vol. 20, No. 11, pages 1033–1037, November 1948.